(12) United States Patent
Park et al.

(10) Patent No.: US 11,967,124 B2
(45) Date of Patent: Apr. 23, 2024

(54) METHOD AND APPARATUS FOR CLASSIFICATION USING NEURAL NETWORK

(71) Applicants: SAMSUNG ELECTRONICS CO., LTD., Suwon-si (KR); SNU R&DB FOUNDATION, Seoul (KR)

(72) Inventors: Seong-Jin Park, Suwon-si (KR); Hyun Oh Song, Seoul (KR); Gaon An, Seoul (KR); Seungju Han, Seoul (KR)

(73) Assignees: SAMSUNG ELECTRONICS CO., LTD., Suwon-si (KR); SNU R&DB FOUNDATION, Seoul (KR)

( * ) Notice: Subject to any disclaimer, the term of this patent is extended or adjusted under 35 U.S.C. 154(b) by 281 days.

(21) Appl. No.: 17/322,976

(22) Filed: May 18, 2021

(65) Prior Publication Data
US 2022/0138494 A1  May 5, 2022

(30) Foreign Application Priority Data

Oct. 30, 2020  (KR) .................. 10-2020-0143677

(51) Int. Cl.
*G06K 9/00* (2022.01)
*G06F 18/21* (2023.01)
(Continued)

(52) U.S. Cl.
CPC ............ *G06V 10/30* (2022.01); *G06F 18/214* (2023.01); *G06F 18/217* (2023.01); *G06F 18/24* (2023.01);
(Continued)

(58) Field of Classification Search
CPC .... G06V 10/30; G06V 10/764; G06V 10/774; G06T 2207/20182; G06T 2207/20081;
(Continued)

(56) References Cited

U.S. PATENT DOCUMENTS 10,944,767 B2 * 3/2021 Goswami ............ H04L 63/1416
2020/0372301 A1 * 11/2020 Kearney .............. G06V 10/764
(Continued)

FOREIGN PATENT DOCUMENTS

| CN | 108322349 A | 7/2018 |
| CN | 111047006 A | 4/2020 |
| KR | 10-2018-0118515 A | 10/2018 |

OTHER PUBLICATIONS

Nguyen, L., Wang, S., & Sinha, A. (2018). A learning and masking approach to secure learning. In Decision and Game Theory for Security: 9th International Conference, GameSec 2018, Seattle, WA, USA, Oct. 29-31, 2018, Proceedings 9 (pp. 453-464). Springer International Publishing. (Year: 2018).*

(Continued)

*Primary Examiner* — Emily C Terrell
*Assistant Examiner* — Kevin M Coomber
(74) *Attorney, Agent, or Firm* — NSIP Law

(57) ABSTRACT

A method and apparatus for classification using a neural network. A classification apparatus includes at least one processor and a memory. The memory is configured to store a classifier and a preprocessor including a defensive noise generator. The at least one processor generates defensive noise from an input image through the defensive noise generator in the preprocessor, generates a combined image by combining the input image and the defensive noise, and outputs a classification result by inputting the combined image to the classifier.

19 Claims, 8 Drawing Sheets

(51) Int. Cl.
*G06F 18/214* (2023.01)
*G06F 18/24* (2023.01)
*G06N 3/094* (2023.01)
*G06V 10/30* (2022.01)
*G06V 10/764* (2022.01)
*G06V 10/774* (2022.01)
*G06V 10/82* (2022.01)

(52) U.S. Cl.
CPC .......... *G06N 3/094* (2023.01); *G06V 10/764* (2022.01); *G06V 10/774* (2022.01); *G06V 10/82* (2022.01)

(58) Field of Classification Search
CPC .......... G06N 3/08; G06N 20/00; G06N 3/094; G06N 3/088; G06F 18/217; G06F 18/21; G06F 18/214; G06F 18/10; G06F 18/24
See application file for complete search history.

(56) References Cited

U.S. PATENT DOCUMENTS

| 2021/0141926 A1* | 5/2021 | Ferrer | G06V 10/454 |
| 2021/0357705 A1* | 11/2021 | Sung | G06V 10/774 |

OTHER PUBLICATIONS

Shen, S., Jin, G., Gao, K., & Zhang, Y. (2017). Ape-gan: Adversarial perturbation elimination with gan. arXiv preprint arXiv: 1707.05474. (Year: 2017).*

Xie, C., Wang, J., Zhang, Z., Zhou, Y., Xie, L., & Yuille, A. (2017). Adversarial examples for semantic segmentation and object detection. In Proceedings of the IEEE international conference on computer vision (pp. 1369-1378) (Year: 2017).*

Samangouei, Pouya, Maya Kabkab, and Rama Chellappa. "Defense-gan: Protecting classifiers against adversarial attacks using generative models." arXiv preprint arXiv:1805.06605 (2018). (17 pages in English).

Li, Yuancheng, and Yimeng Wang. "Defense against adversarial attacks in deep learning." Applied Sciences 9.1 (2019): 76. (14 pages in English).

Ren, Kui, et al. "Adversarial attacks and defenses in deep learning." Engineering 6.3 (2020): 346-360. (15 pages in English).

Liu, Guanxiong, Issa Khalil, and Abdallah Khreishah. "GanDef: A Gan based adversarial training defense for neural network classifier." IFIP International Conference on ICT Systems Security and Privacy Protection. Springer, Cham, 2019. (14 pages in English).

Madry, Aleksander, et al. "Towards deep learning models resistant to adversarial attacks." arXiv preprint arXiv:1706.06083 (2017). (28 pages in English).

Wang, Huaxia, and Chun-Nam Yu. "A direct approach to robust deep learning using adversarial networks." arXiv preprint arXiv:1905.09591 (2019). (15 pages in English).

Liu, Xuanqing, and Cho-Jui Hsieh. "Rob-gan: Generator, discriminator, and adversarial attacker." Proceedings of the IEEE/CVF Conference on Computer Vision and Pattern Recognition. 2019. (10 pages in English).

Tsipras, Dimitris, et al. "Robustness may be at odds with accuracy." arXiv preprint arXiv:1805.12152 (2018). (24 pages in English).

* cited by examiner

METHOD AND APPARATUS FOR CLASSIFICATION USING NEURAL NETWORK

CROSS-REFERENCE TO RELATED APPLICATIONS

This application claims the benefit under 35 USC § 119(a) of Korean Patent Application No. 10-2020-0143677 filed on Oct. 30, 2020, in the Korean Intellectual Property Office, the entire disclosure of which is incorporated herein by reference for all purposes.

BACKGROUND

1. Field

The following description relates to technology for classification using a neural network, and more particularly, to technology for classification that is robust against noise.

2. Description of Related Art

Neural network technology is used in many fields, such as image classification and speech recognition. A neural network is trained with a large amount of training data to classify input data. However, when input data dissimilar to the training data are input, the accuracy of classification results may be lowered. In particular, the neural network is vulnerable to adversarial attacks that change prediction results through perturbation of input data.

The above description has been possessed or acquired by the inventor(s) in the course of conceiving the present disclosure and is not necessarily an art publicly known before the present application is filed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented classification method includes generating defensive noise from an input image, generating a combined image by combining the input image and the defensive noise, and outputting a classification result by inputting the combined image to a classifier.

The defensive noise may be generated by a defensive noise generator trained to reduce a total loss value in a training process, and an adversarial noise generator may be trained to increase the total loss value, wherein the total loss value may be calculated from a denoised noised training image and a denoised training image, the denoised noised training image may be a result of applying adversarial noise generated by the adversarial noise generator and the defensive noise generated by the defensive noise generator to a training image, and the denoised training image may be a result of applying the defensive noise to the training image.

The total loss value may be calculated based on a first loss value and a second loss value, the first loss value may be calculated from the denoised noised training image using a first loss function, and the second loss value may be calculated from the denoised training image using a second loss function.

The total loss value may be calculated through a weighted average by applying a first weight to the first loss value and applying a second weight to the second loss value.

The classification method may further include determining whether adversarial noise is applied to the input image, by a noise discriminator, and outputting the classification result by inputting the input image to the classifier, in response to the adversarial noise not being applied to the input image.

In another general aspect, a method of training a preprocessor includes generating adversarial noise from a training image through an adversarial noise generator, generating a noised training image by combining the training image and the adversarial noise, generating defensive noise from the noised training image through the defensive noise generator, generating a denoised noised training image by combining the noised training image and the defensive noise, calculating a total loss value by inputting the denoised noised training image to a classifier, and training the adversarial noise generator and the defensive noise generator based on the total loss value.

The training may include training the adversarial noise generator to increase the total loss value and training the defensive noise generator to decrease the total loss value.

The method may further include generating a denoised training image by combining the training image and the defensive noise.

The calculating may include calculating the total loss value from the denoised noised training image and the denoised training image using a total loss function.

The calculating may include calculating a first loss value for the denoised noised training image using a first loss function, calculating a second loss value for the denoised training image using a second loss function, and calculating the total loss value based on the first loss value and the second loss value.

The calculating of the total loss value based on the first loss value and the second loss value may include calculating the total loss value by calculating a weighted average by applying a first weight to the first loss value and applying a second weight to the second loss value.

The method may further include determining whether the adversarial noise is applied to the noised training image through a noise discriminator, and training the noise discriminator based on a result of the determining.

In another general aspect, a non-transitory computer-readable storage medium may store instructions that, when executed by a processor, cause the processor to perform the classification method.

In another general aspect, a classification apparatus includes at least one processor, and a memory configured to store a classifier and a preprocessor including a defensive noise generator, and the processor is configured to generate defensive noise from an input image through the defensive noise generator in the preprocessor, generate a combined image by combining the input image and the defensive noise, and output a classification result by inputting the combined image to the classifier.

In another general aspect, an apparatus includes one or more processor configured to generate defensive noise from input data through a defensive noise generator; generate adversarial noise from training data through an adversarial noise generator; generate denoised noised training data by applying the adversarial noise and the defensive noise to the training data; generate denoised training data by applying the defensive noise to the training data; calculate a total loss value based on the denoised noised training data and the denoised training data; and train the adversarial noise generator to increase the total loss value and train the defensive noise generator to decrease the total loss value.

The one or more processors may be configured to generate combined data by combining the input image and the defensive noise; and generate a classification result by inputting the combined image to a classifier.

The classifier may be pre-trained and may be configured to train the adversarial noise generator to increase the total loss value and train the defensive noise generator to decrease the total loss value.

Other features and aspects will be apparent from the following detailed description, the drawings, and the claims.

Figure 1:
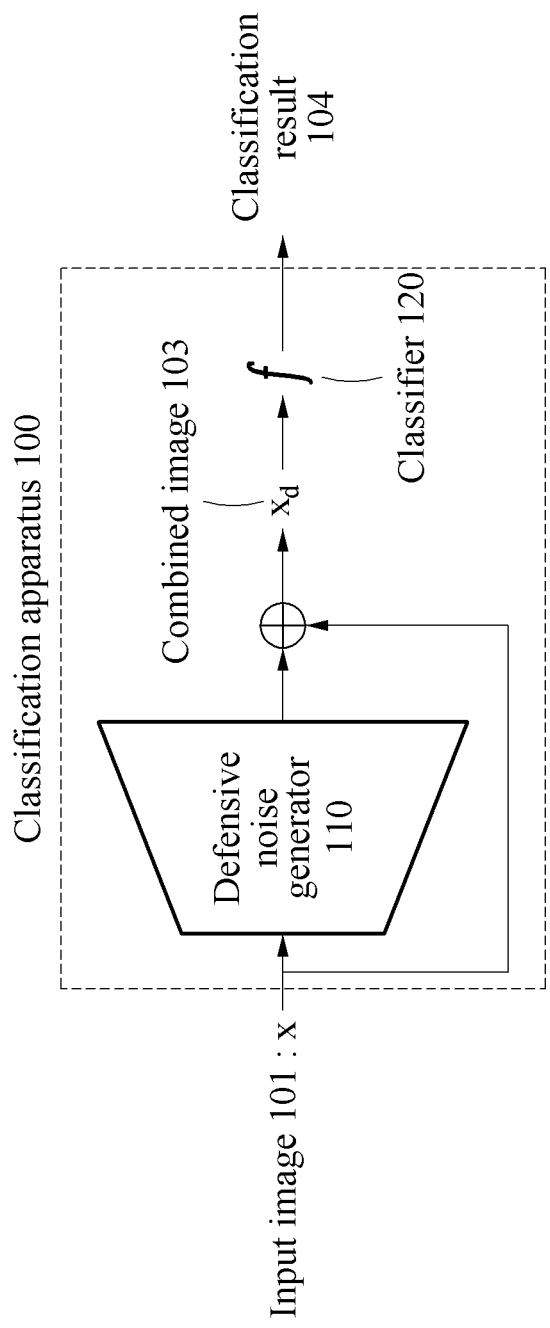
FIG. 1 illustrates an example of an operation of a classification apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed structural or functional description is provided as an example only and various alterations and modifications may be made to the examples. Here, the examples are not construed as limited to the disclosure and should be understood to include all changes, equivalents, and replacements within the idea and the technical scope of the disclosure.

Terms, such as first, second, and the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, examples will be described in detail with reference to the accompanying drawings. When describing the examples with reference to the accompanying drawings, like reference numerals refer to like components and a repeated description related thereto will be omitted.

FIG. 1 illustrates an example of an operation of a classification apparatus.

A classification apparatus 100 may reduce noise in an input image through preprocessing and classify the input image. The classification apparatus 100 may perform preprocessing to reduce noise in the input image. The classification apparatus 100 may generate defensive noise based on the input image and apply the defensive noise to the input image, thereby reducing the noise. Through this, the classification apparatus 100 may increase the accuracy of classification results.

The classification apparatus 100 may be applied to artificial intelligence systems in the field of industries directly related to human life or security, such as the medical industry and the security industry, to increase stability. The classification apparatus 100 may be applied to artificial intelligence systems that need to operate well in various environments, such as an unmanned drone and an autonomous vehicle. However, examples not limited thereto. The classification apparatus 100 may be applied to all artificial intelligence systems related to biometric recognition including image recognition and speech recognition.

In an example, the classification apparatus 100 may increase resistance or robustness against diminutive changes in input values for a neural network. To this end, the classification apparatus 100 may include a preprocessor including a defensive noise generator. The classification apparatus 100 generates defensive noise from an input image through the defensive noise generator in the preprocessor. The classification apparatus 100 generates a combined image by combining the input image and the defensive noise. The classification apparatus 100 calculates a loss value by inputting the combined image to a classifier. The classification apparatus 100 classifies the combined image based on the loss value.

A training process uses an adversarial noise generator as well as a defensive noise generator, unlike the inference process. The defensive noise generator and the adversarial noise generator may include generative adversarial networks (GANs).

In the training process, the preprocessor may be trained to increase the robustness of the classifier that has already been trained. In the training process, the adversarial noise generator and the defensive noise generator may be trained simultaneously. The adversarial noise generator may be trained to add small noise to a provided input value such that the classifier may make an incorrect inference. The defensive noise generator may be trained to remove adversarial noise in a received training image such that the classifier may make a correct determination. The defensive noise generator may be trained to reduce a total loss value in the training process, and the adversarial noise generator may be trained to increase the total loss value.

The total loss value may be calculated based on a training image to which the adversarial noise is applied and then the defensive noise is applied, and a training image to which only the defensive noise is applied. The training image to which the adversarial noise is applied and then the defensive noise is applied is a result of denoising, by the defensive noise, a training image noised by applying the adversarial noise thereto. As such, the result of applying the adversarial noise generated by the adversarial noise generator and the defensive noise generated by the defensive noise generator to the training image may be referred to as a denoised noised training image. The training image to which only the defensive noise is applied is a result of denoising a training image that is not noised. As such, the result of applying the defensive noise to the training image may be referred to as a denoised training image.

The total loss value may be calculated based on a first loss value and a second loss value. Here, the first loss value may be calculated from the denoised noised training image using a first loss function. The second loss value may be calculated from the denoised training image using a second loss function.

The respective loss values of the denoised noised training image and the denoised training image are reflected because in the inference process, unlike the training process, it is impossible to know whether adversarial noise is applied to an input image. If the training process is simply performed for only the denoised noised training image, the accuracy of classifying an input image to which adversarial noise is not applied may be lowered. The classification apparatus 100 may be trained even with denoised training images in the training process and thus, exhibit high accuracy even for an input image to which adversarial noise is not applied.

The total loss value may be calculated through a weighted average by applying a first weight to the first loss value and applying a second weight to the second loss value. Here, the first weight is a weight for better defense against adversarial noise. The second weight is a weight for preventing the input image from being damaged by defensive noise when there is no adversarial noise. The classification apparatus 100 may adjust the first weight and the second weight, thereby adjusting the accuracy of both.

When the training process ends, the defensive noise generator is connected to the classifier and included in the classification apparatus 100. The classification apparatus 100 may preprocess an input image, transmit the preprocessed input image to the classifier, and output a classification result through the classifier. Referring to FIG. 1, the classification apparatus 100 may include a defensive noise generator 110 and a classifier 120 that are trained in advance.

The classification apparatus 100 may receive an input image 101 "x". The defensive noise generator 110 receives the input image 101 "x" and generates defensive noise suitable for the input image 101 "x". The classification apparatus 100 may generate a combined image 103 "$x_d$" by combining the defensive noise and the input image 101 "x". The classification apparatus 100 may generate a classification result 104 as a result of applying the combined image 103 "$x_d$" to the classifier 120.

When adversarial noise is applied to the input image 101 "x", the combined image 103 "$x_d$" may be an image in which the adversarial noise is reduced. When adversarial noise is not applied to the input image 101 "x", the combined image 103 "$x_d$" may be the input image 101 "x" that is not significantly distorted. In the training process, a total loss value is calculated based on a training image to which adversarial noise is applied and then defensive noise is applied, and a training image to which only the defensive noise is applied. Thus, the classification apparatus 100 may exhibit high accuracy irrespective of whether adversarial noise is applied.

In another example, the preprocessor in the classification apparatus 100 may further include a noise discriminator. In the inference process, the noise discriminator may determine whether noise is applied to the input image prior to defensive noise generation, and if noise is not applied, omit defensive noise and output a result of classifying the input image. This may lower the possibility of errors to be caused by defensive noise.

To this end, in the training process, the noise discriminator may determine whether adversarial noise is applied to the noised training image. The noise discriminator may be trained based on a determination result. To train the noise discriminator, a noise determination loss value may be introduced. The noise determination loss value may be calculated by adding up a third loss value and a fourth loss value. The third loss value may reflect how well the adversarial noise generator deceives the noise discriminator, and the fourth loss value may reflect how well the noise discriminator determines whether adversarial noise is applied.

TABLE 1

| | | Defense method | | |
|---|---|---|---|---|
| | | None | PGD | DefG |
| Attack method | None | 99.28% | 97.32% | 98.94% |
| | AdvG | 22.76% | 96.45% | 98.85% |
| | PGD | 0.01% | 87.00% | 86.74% |

Table 1 shows the experiment results of combining various attack methods and defense methods. In the experiment in Table 1, a dataset is MNIST (a dataset of handwritten digits from 0 to 9). For the defense methods "None" and "DefG", the classifier is a neural network that includes two convolutional layers and one fully connected layer and that has already been trained. For the defense method "PGD", the classifier is a neural network that includes two convolutional layers and one fully connected layer and that is trained in advance through PGD adversarial training. The same architecture was used for both the adversarial noise generator and the defensive noise generator. For the attack method "AdvG", the classifier is a neural network that includes two convolutional layers and two deconvolutional layers. Training was performed for 60 epochs with an Adam optimizer.

The columns of Table 1 represent various defense methods. The defense method "None" uses a neural network not trained by adversarial training and does not go through separate preprocessing. The defense method "DefG uses a neural network not trained by adversarial training and goes through preprocessing by the defensive noise generator. The defense method "PGD" uses a neural network trained by PGD adversarial training and does not use separate preprocessing.

The rows of Table 1 represent various attack methods. The attack method "None" is a case without attacks, and the attack method "PGD" is an adversarial example generated by PGD adversarial training. The attack method "AdvG" is an adversarial example generated through the adversarial noise generator. Each of the values in Table 1 is the accuracy of classifying 10,000 test set images, expressed in percent (%).

According to Table 1, the defensive noise generator in the classification apparatus 100 shows high accuracy (98.85%) against attacks by the adversarial noise generator. The classification apparatus 100 maintains high accuracy (98.94%) for the case without attacks as well, by not distorting the original image significantly. Further, for the adversarial example generated in PGD, the classification apparatus 100 exhibits considerable accuracy (86.74%) even though the defensive noise generator has not been trained. The classification apparatus 100 exhibits higher accuracy in all cases than the accuracy (97.32%, 96.45%, 87%) of the classifier trained based on PGD.

TABLE 2

|  |  | Defense method | |
|---|---|---|---|
|  |  | None | DefG |
| Attack method | None | 99.28% | 98.94% |
|  | AdvG | 22.76% | 98.85% |
|  | AdvG* | 23.12% | 98.91% |

Table 2 shows a comparison between a defensive noise generator attacked by an adversarial noise generator trained together and a defensive noise generator attacked by an adversarial noise generator not trained together. "AdvG" in the rows of Table 2 represents a case of attacks by an adversarial example generated by the adversarial noise generator when the defensive noise generator and the adversarial noise generator are trained together. "AdvG*" represents a case of attacks by an adversarial example generated by the adversarial noise generator when the defensive noise generator and the adversarial noise generator are not trained together.

Referring to Table 2, the accuracy (98.91%) when the adversarial noise generator not trained together is used is higher than the accuracy (98.85%) when the adversarial noise generator trained together is used. As such, the classification apparatus 100 shows the results are robust against attacks by a separately trained adversarial noise generator.

TABLE 3

|  | PGD-based adversarial training | Method of Classification Apparatus 100 |
|---|---|---|
| Training time (hr) | 5.183 | 1.462 |

Table 3 shows a comparison of a training time when a PGD-based adversarial training technique is used and a training time of the classification apparatus 100. In the case of training the classification apparatus 100, a PGD algorithm is not used in the process of generating an adversarial example, and thus a required amount of operation may be reduced, allowing faster training. According to Table 3, the training of the classification apparatus 100 is 3 to 4 times faster than the PGD-based adversarial training technique.

Figure 2:
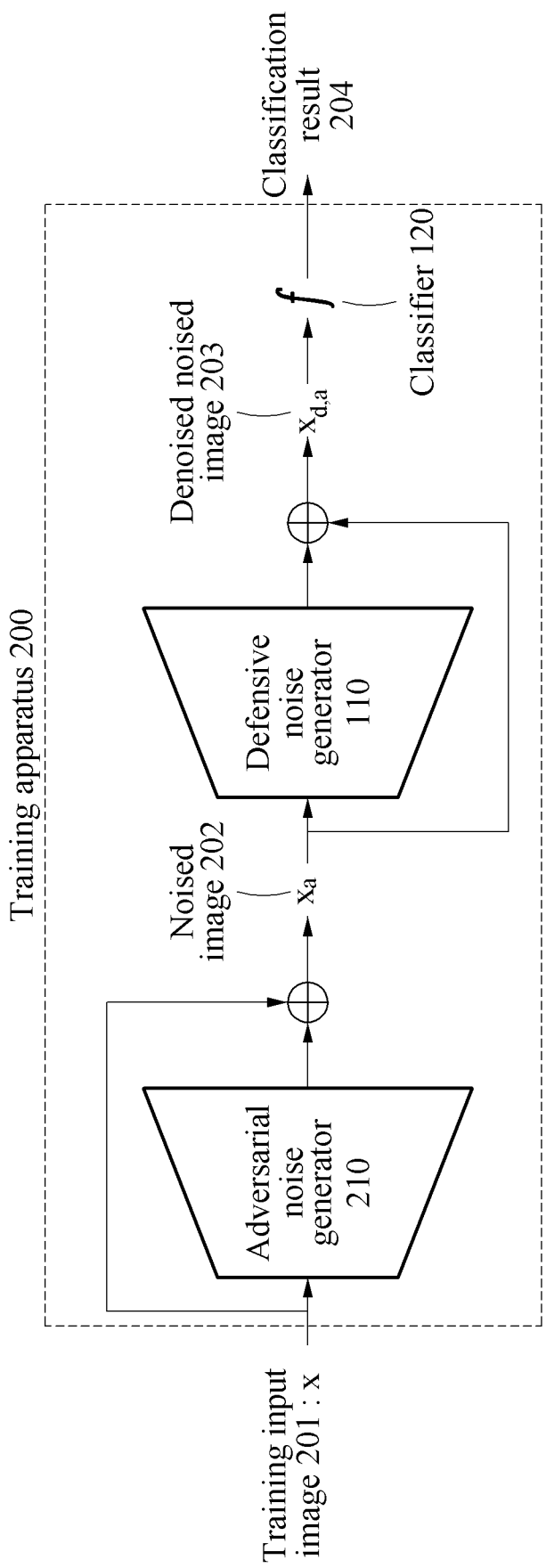
FIG. 2 illustrates an example of an operation of a training apparatus.

FIG. 2 illustrates an example of an operation of a training apparatus.

Referring to FIG. 2, a training apparatus 200 may train a preprocessor including a defensive noise generator. The training apparatus 200 may include an adversarial noise generator 210, the defensive noise generator 110, and the classifier 120 "f". The classifier 120 may be trained in advance.

The adversarial noise generator 210 generates adversarial noise from a training image. The adversarial noise generator 210 may receive a training input image 201 "x". The adversarial noise generator 210 may generate adversarial noise such that the classifier 120 incorrectly classifies the training input image 201 "x".

The training apparatus 200 generates a noised training image by combining the training image and the adversarial noise. The adversarial noise and the training input image 201 "x" may be combined into a noised image 202 "$x_a$".

The defensive noise generator 110 generates defensive noise from the noised training image. The defensive noise generator 110 may receive the noised image 202 "$x_a$". The defensive noise generator 110 may generate defensive noise based on the noised image 202 "$x_a$". The defensive noise generator 110 may generate the defensive noise such that the classifier may classify the noised image 202 "$x_a$" again.

The training apparatus 200 generates a denoised noised training image by combining the noised training image and the defensive noise. The defensive noise and the noised image 202 "$x_a$" may be combined into a denoised noised image 203 "$x_{d,a}$". The training apparatus 200 may generate a denoised training image by combining the training image and the defensive noise.

The training apparatus 200 calculates a total loss value by inputting the denoised noised training image to the classifier 120. The training apparatus 200 may train the adversarial noise generator 210 to increase the total loss value and train the defensive noise generator 110 to decrease the total loss value. The training apparatus 200 trains the adversarial noise generator 210 and the defensive noise generator 110 based on the total loss value.

The classifier 120 may receive the denoised noised image 203 "$x_{d,a}$". The classifier 120 may output a classification result 204. The classification result 204 may be input to a total loss function to output the total loss value. The training apparatus 200 may calculate the total loss value from the denoised noised training image and the denoised training image using the total loss function. The training apparatus 200 may calculate a first loss value for the denoised noised training image using a first loss function. The training apparatus 200 may calculate a second loss value for the denoised training image using a second loss function. The training apparatus 200 may calculate the total loss value based on the first loss value and the second loss value. The total loss function is expressed by Equation 1.

$$\min_{\phi} \max_{\psi} \ell(\psi, \phi) = \mathbb{E}_{(x,y) \sim D}[\ell_{adv}(x, y; \psi, \phi) + \ell_{clean}(x, y; \phi)] \quad \text{[Equation 1]}$$

In equation 1, x and y denote the training input image 201 and a corresponding label, respectively. D denotes the distribution of a dataset, and ψ and ϕ denote parameters that are learnable by the adversarial noise generator 210 and the defensive noise generator 110. Further, $l_{adv}$ and $l_{clean}$ denote a first loss value when an adversarial example is preprocessed and a second loss value when the original image is preprocessed, satisfying Equation 2 and Equation 3, respectively.

In Equation 2 below, $AdvG_\psi(x)+x$ denotes the noised image 202 "$x_a$", $DefG_\phi(AdvG_\psi(x)+x)$ denotes the defensive noise, and $(AdvG_\psi(x)+x)+DefG_\phi(AdvG_\psi(x)+x)$ denotes the denoised noised image 203 "$x_{d,a}$". In Equation 3 below, $x+DefG_\phi(x)$ denotes a training input image to which adversarial noise is not applied, but only defensive noise is applied. The training apparatus 200 may calculate the total loss value by calculating a weighted average by applying a first weight to the first loss value and applying a second weight to the second loss value.

$$\ell_{adv}(x,y;\psi,\phi) := \ell_c((AdvG_\psi(x)+x)+DefG_\phi(AdvG_\psi(x)+x)),y)$$ [Equation 2]

$$\ell_{clean}(X,y;\phi) := \ell_c(f(x+DefG_\phi(X)),y)$$ [Equation 3]

Figure 3:
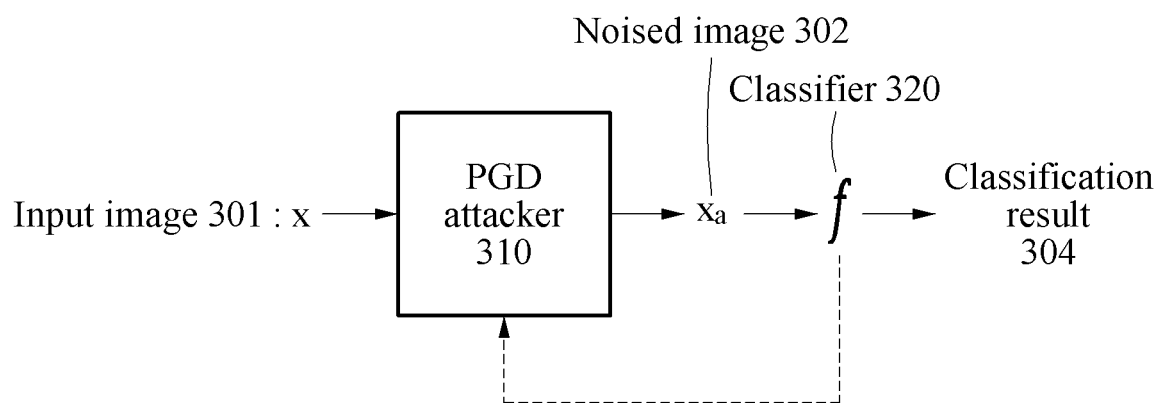
FIG. 3 illustrates an example of training a classifier by projected gradient descent (PGD).

FIG. 3 illustrates an example of training a classifier by projected gradient descent (PGD).

The PGD-based adversarial training technique, which is the most widely used method to increase robustness, is one of the data augmentation techniques. The PGD-based adversarial training technique generates an adversarial example from training data and then trains a neural network to have a loss function value for the adversarial example close to zero.

Referring to FIG. 3, in the training process, a PGD attacker 310 receives an input image 301 "x". The PGD attacker 310 may apply noise to the input image 301 "x". The PGD attacker 310 may output a noised image 302 "$x_a$". The noised image 302 "$x_a$" may be input to a classifier 320. The classifier 320 "f" may output a classification result 304 from the noised image 302 "$x_a$". The PGD attacker 310 may optimize noise based on the classification result 304. This optimization process is commonly repeated 10 times or more. The classifier 320 "f" is trained based on the classification result 304.

The PGD-based adversarial training technique requires a relatively long training time as going through the process of optimizing an adversarial example using PGD in the process of generating the adversarial example. For example, the PGD-based adversarial training technique generally requires an amount of operation that is at least 10 times that of typical neural network training techniques. In addition, to apply the PGD-based adversarial training technique to the already trained neural network, the entire neural network needs to be trained again.

In an example, the classification apparatus 100 uses an adversarial noise generator instead of the PGD attacker 310. The PGD attacker 310 goes through the optimization process at least 10 times for every sample. However, the adversarial noise generator does not go through a separate optimization process for an input image, and thus the time required for training is significantly reduced.

Figure 4:
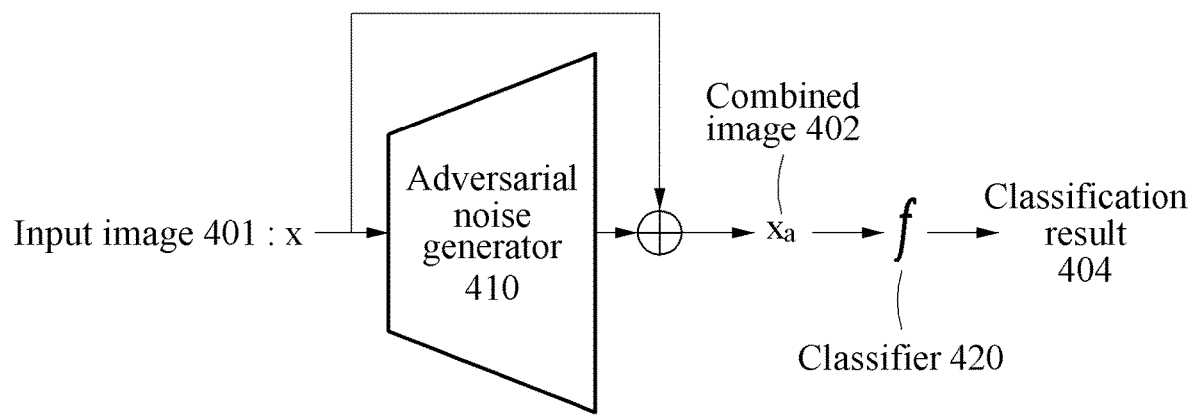
FIG. 4 illustrates an example of training a classifier using only an adversarial noise generator.

FIG. 4 illustrates an example of training a classifier using only an adversarial noise generator.

A generator-based adversarial training technique which generates an adversarial example and uses data augmentation, but trains a generator configured as a neural network to generate an adversarial example.

Referring to FIG. 4, in the training process, an input image 401 "x" is input to an adversarial noise generator 410. The adversarial noise generator 410 generates adversarial noise corresponding to the input image 401 "x". The adversarial noise and the input image 401 "x" are combined into a combined image 402 "$x_a$". The combined image 402 "$x_a$" is input to a classifier 420 "f", and the classifier 420 "f" outputs a classification result 404. The classifier 420 "f" is trained to decrease a loss value based on the classification result 404.

Compared to the PGD-based adversarial training technique, the generator-based adversarial training technique has the advantage of reducing the cost of generating an adversarial example, but its defense performance is significantly lower. In addition, to apply the generator-based adversarial training technique to the already trained neural network, the entire neural network needs to be trained again.

In an example, the classification apparatus 100 introduces a defensive noise generator together with the adversarial noise generator 410 to the training process. In the training process, the generator-based adversarial training technique trains the adversarial noise generator 410 and the classifier 420 "f", whereas the classification apparatus 100 includes the classifier 420 "f" that has already been trained and trains the adversarial noise generator and the defensive noise generator.

The classification apparatus 100 uses the defensive noise generator, thereby achieving higher accuracy than the generator-based adversarial training technique. In addition, since the classification apparatus 100 connects the defensive noise generator to the already trained classifier as a preprocessor, the training time may be reduced.

Figure 5:
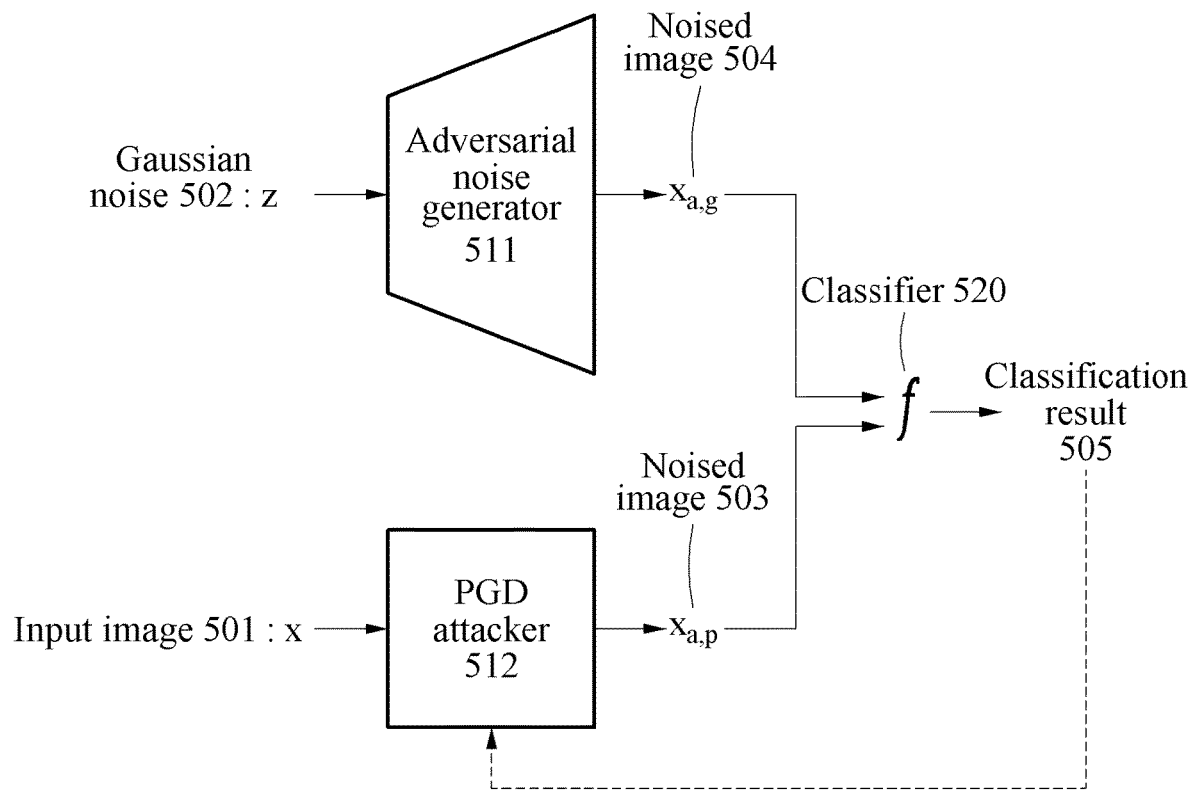
FIG. 5 illustrates an example of training a classifier using a combination of PGD and adversarial noise.

FIG. 5 illustrates an example of training a classifier using a combination of PGD and adversarial noise.

Referring to FIG. 5, an adversarial noise generator 511 receives Gaussian noise 502 "z" and outputs a noised image 504 "$x_{a,g}$". A PGD attacker 512 receives an input image 501 "x" and generates a noised image 503 "$x_{a,p}$". A classifier 520 receives the noised images 503 and 504 and outputs a classification result 505. The PGD attacker 512 optimizes the noised image 503 "$x_{a,p}$" based on the classification result 505. When the optimization is completed, the final classification result 505 is output, and the adversarial noise generator 511 and the classifier 520 are trained based on the final classification result 505.

The fusion technique of FIG. 5 may achieve high accuracy compared to the generator-based adversarial training technique. However, the fusion technique requires a relatively long training time as going through the process of optimizing an adversarial example using PGD in the process of generating the adversarial example. In addition, the entire classifier 520 that has already been trained needs to be trained again.

In an example, the classification apparatus 100 introduces a defensive noise generator together with the adversarial noise generator 511 to the training process. The classification apparatus 100 includes the classifier 520 "f" that has already been trained and trains the adversarial noise generator and the defensive noise generator and thus, requires less training time. In addition, the classification apparatus 100 does not go through the PGD optimization process and thus, requires much less training time.

Figure 6:
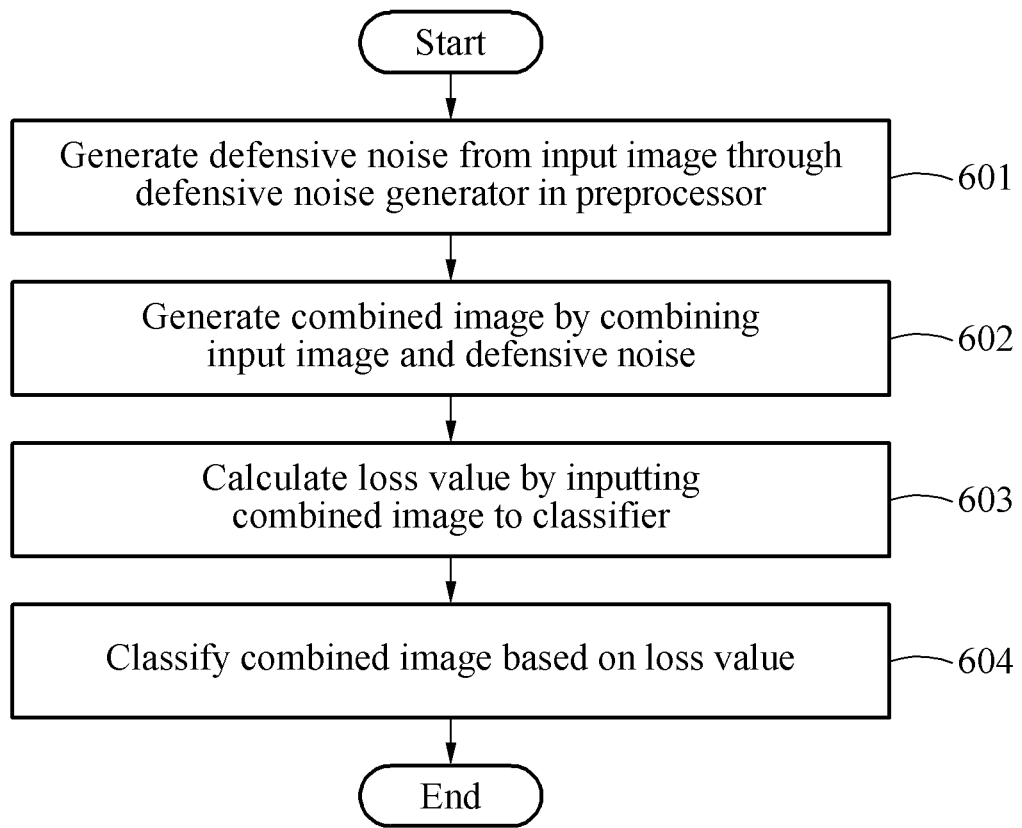
FIG. 6 illustrates an example of a classification method.

FIG. 6 illustrates an example of a classification method.

Referring to FIG. 6, in operation 601, the classification apparatus 100 generates defensive noise from an input image through a defensive noise generator in a preprocessor. The defensive noise generator may be trained in advance together with an adversarial noise generator in the training process. In the training process, the adversarial noise generator may be trained to increase a loss value, and the defensive noise generator may be trained to decrease the loss value. The adversarial noise generator and the defensive noise generator may be formed of GANs.

In operation 602, the classification apparatus 100 generates a combined image by combining the input image and the defensive noise. When adversarial noise is applied to the input image, the effect of noise may be reduced by the defensive noise. Meanwhile, in the training process, training is performed even for a case in which only defensive noise is applied to a training input image. Thus, in the inference process, even when adversarial noise is not applied to the training input image, a high level of accuracy may be achieved.

In operation 603, the classification apparatus 100 may output a classification result by inputting the combined image to a classifier. The classification apparatus 100 may obtain an output vector by inputting the preprocessed combined image to the classifier. The classification apparatus 100 may obtain the classification result based on the output vector.

Figure 7:
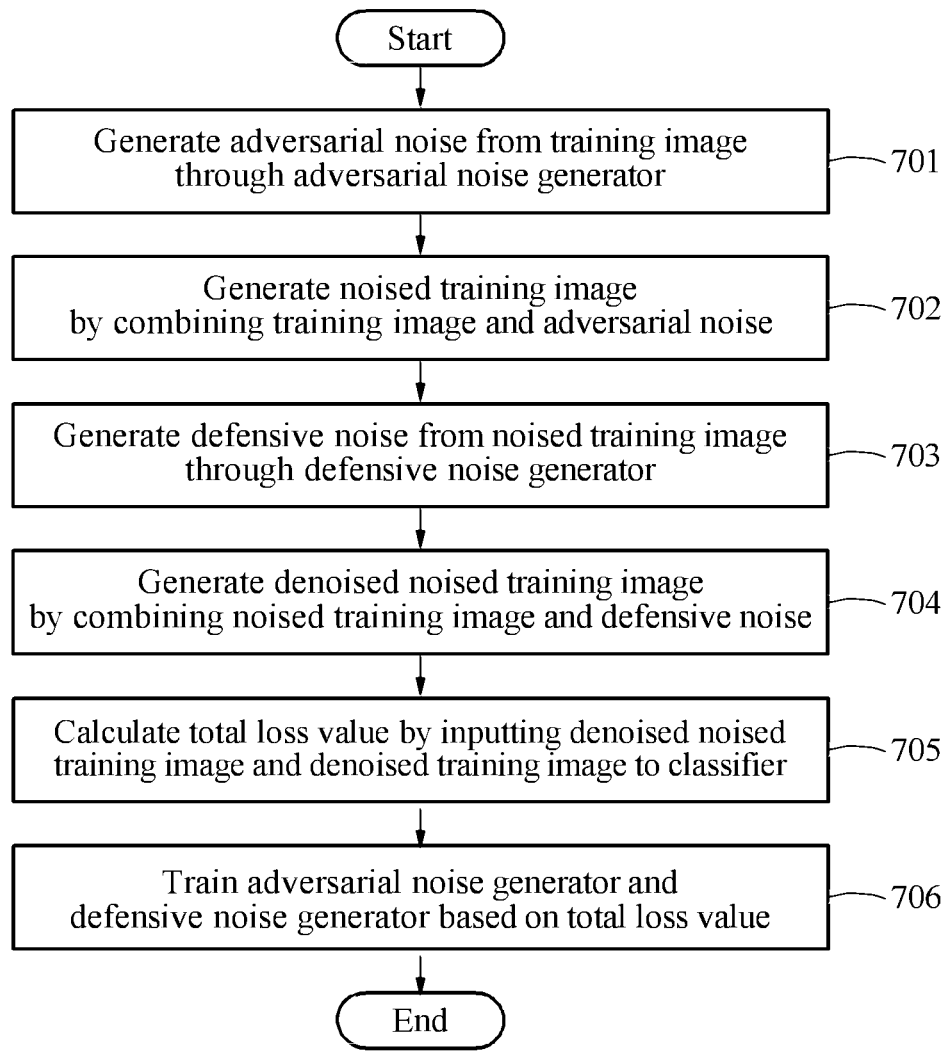
FIG. 7 illustrates an example of a training method.

FIG. 7 illustrates an example of a training method.

Referring to FIG. 7, in operation 701, a training apparatus generates adversarial noise from a training image through an adversarial noise generator. In the training process, unlike the inference process, an adversarial noise generator is introduced together with a defensive noise generator. The adversarial noise generator and the defensive noise generator may be configured as GANs.

In operation 702, the training apparatus generates a noised training image by combining the training image and the adversarial noise. Alternatively, the training apparatus may directly transfer the training image that is not combined with the adversarial noise to the defensive noise generator.

In operation 703, the training apparatus generates defensive noise from the noised training image through the defensive noise generator. The defensive noise may be generated to reduce adversarial noise.

In operation 704, the training apparatus generates a denoised noised training image by combining the noised training image and the defensive noise. The training apparatus may output the denoised noised training image by combining the defensive noise with the noised training image. Meanwhile, the training apparatus may output a denoised training image by combining the defensive noise with the training image.

In operation 705, the training apparatus calculates a total loss value by inputting the denoised noised training image to the classifier. The training apparatus may calculate the total loss value by inputting the denoised noised training image and the denoised training image to the classifier. The training apparatus may calculate a first loss value from the denoised noised training image and calculate a second loss value from the denoised training image. The training apparatus may calculate the total loss value by combining the first loss value and the second loss value. The training apparatus may calculate the total loss value through a weighted average of the first loss value and the second loss value.

In operation 706, the training apparatus trains the adversarial noise generator and the defensive noise generator based on the total loss value. The adversarial noise generator may be trained to increase the total loss value, and the defensive noise generator may be trained to decrease the total loss value.

Figure 8:
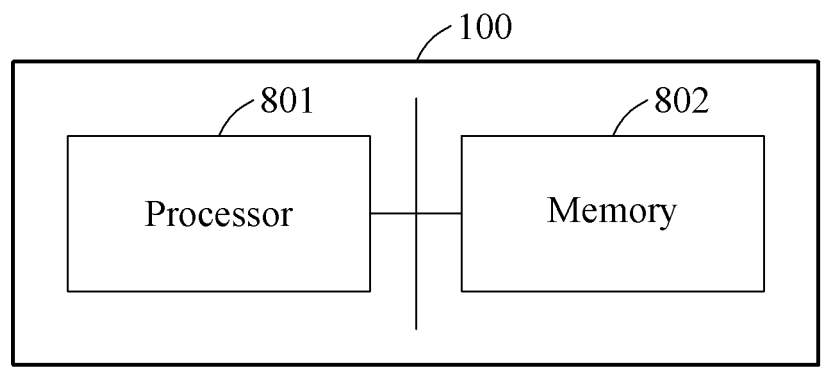
FIG. 8 illustrates an example of a configuration of a classification apparatus.

FIG. 8 illustrates an example of a configuration of a classification apparatus.

Referring to FIG. 8, the classification apparatus 100 includes at least one processor 801 and a memory 802. The memory 802 stores a classifier, and a preprocessor including a defensive noise generator.

The processor 801 generates defensive noise from an input image through the defensive noise generator in the preprocessor. The processor 801 generates a combined image by combining the input image and the defensive noise. The processor 801 outputs a classification result by inputting the combined image to the classifier.

The defensive noise generator may be trained together with an adversarial noise generator. The training of the defensive noise generator and the adversarial noise generator does not go through a separate optimization process for the input image, and thus the time required for training is significantly reduced. In addition, since the defensive noise generator is connected to the already trained classifier as a preprocessor, the training time may be further reduced.

The units described herein may be implemented using a hardware component, a software component and/or a combination thereof. A processing device may be implemented using one or more general-purpose or special-purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such a parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

A number of examples have been described above. Nevertheless, it should be understood that various modifications may be made to these examples. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. A processor-implemented classification method, comprising: generating defensive noise from the input image;
   generating a combined image by combining the input image and the defensive noise; and
   outputting a classification result by inputting the combined image to a classifier,
   wherein the defensive noise is generated by a defensive noise generator trained to reduce a total loss value in a training process, and wherein the total loss value is determined using a total loss function by inputting a denoised noised training image and a denoised training image to the classifier,
   wherein the denoised noised training image is a result of applying adversarial noise generated by an adversarial noise generator and the defensive noise generated by the defensive noise generator to a training image, and wherein the denoised training image is a result of applying the defensive noise to the training image.

2. The processor-implemented classification method of claim 1, wherein the total loss value is determined based on a first loss value and a second loss value,
   the first loss value is determined from the denoised noised training image using a first loss function, and
   the second loss value is determined from the denoised training image using a second loss function.

3. The processor-implemented classification method of claim 2, wherein the total loss value is determined through a weighted average by applying a first weight to the first loss value and applying a second weight to the second loss value.

4. A method of training a preprocessor, the method comprising:
   generating adversarial noise from a training image through an adversarial noise generator;
   generating a noised training image by combining the training image and the adversarial noise;
   generating defensive noise from the noised training image through a defensive noise generator;
   generating a denoised noised training image by combining the noised training image and the defensive noise;
   generating a denoised training image by combining the training image and the defensive noise;
   determining a total loss value by inputting the denoised noised training image and the denoised training image to the classifier using a total loss function; and
   training, based on the total loss value, the adversarial noise generator and the defensive noise generator.

5. The method of claim 4, wherein the training comprises training the adversarial noise generator to increase the total loss value and training the defensive noise generator to decrease the total loss value.

6. The method of claim 4, wherein the calculating comprises:
   determining a first loss value for the denoised noised training image using a first loss function;
   determining a second loss value for the denoised training image using a second loss function; and
   determining the total loss value based on the first loss value and the second loss value.

7. The method of claim 6, wherein the determining of the total loss value based on the first loss value and the second loss value comprises determining the total loss value by determining a weighted average by applying a first weight to the first loss value and applying a second weight to the second loss value.

8. The method of claim 4, further comprising:
   determining whether the adversarial noise is applied to the noised training image through a noise discriminator; and
   training the noise discriminator based on a result of the determining.

9. A non-transitory computer-readable storage medium storing instructions that, when executed by a processor, cause the processor to perform the classification method of claim 1.

10. A classification apparatus, comprising: at least one processor; and
    a memory,
    wherein the memory is configured to store a classifier and a preprocessor comprising a defensive noise generator, and
    wherein the at least one processor is configured to generate defensive noise from an input image through the defensive noise generator in the preprocessor;
    generate a combined image by combining the input image and the defensive noise; and
    output-a classification result by inputting the combined image to the classifier wherein the defensive noise is generated by a defensive noise generator trained to reduce a total loss value in a training process, and wherein the total loss value is determined using a total loss function by inputting a denoised noised training image and a denoised training image to the classifier,
    wherein the denoised noised training image is a result of applying adversarial noise generated by an adversarial noise generator and the defensive noise generated by the defensive noise generator to a training image, and wherein the denoised training image is a result of applying the defensive noise to the training image.

11. An apparatus comprising:
    one or more processors configured to:
    generate defensive noise from input data through a defensive noise generator;
    generate adversarial noise from training data through an adversarial noise generator;
    generate denoised noised training data by applying the adversarial noise and the defensive noise to the training data;
    generate denoised training data by applying the defensive noise to the training data;
    generate a denoised training image by combining the training image and the defensive noise;
    determine a total loss value based on the denoised noised training data and the denoised training data using a total loss function; and
    train, based on the total loss value, the adversarial noise generator to increase the total loss value and train the defensive noise generator to decrease the total loss value.

12. The apparatus of claim 11, wherein the one or more processors are further configured to
    generate a classification result by inputting the combined image to a classifier.

13. The apparatus of claim 12, wherein the classifier is pre-trained and is configured to train the adversarial noise generator to increase the total loss value and train the defensive noise generator to decrease the total loss value.

14. The method of claim 1, wherein the adversarial noise is not applied to the combined image.

15. The method of claim 4, wherein the adversarial noise is not applied to the denoised training image.

16. The apparatus of claim 11, wherein the adversarial noise is not applied to the denoised training image.

17. The method of claim 1, wherein the combined image is generated by applying the defensive noise to the input image directly.

18. The apparatus of claim 10, wherein the combined image is generated by applying the defensive noise to the input image directly.

19. The processor-implemented classification method of claim 1, further comprising:
   determining whether adversarial noise is applied to the input image; and
   outputting the classification result by inputting the input image to the classifier, in response to the adversarial noise not being applied to the input image.

* * * * *